United States Patent
Huang

(10) Patent No.: US 9,238,748 B2
(45) Date of Patent: Jan. 19, 2016

(54) AQUEOUS BICOMPONENT BAKING TYPE AUTOMOBILE FINISHING VARNISH WITH IMPROVED ACID ETCHING RESISTANCE AND PREPARATION METHOD THEREOF

(71) Applicant: Jumei Huang, Wuwei (CN)

(72) Inventor: Jumei Huang, Wuwei (CN)

(*) Notice: Subject to any disclaimer, the term of this patent is extended or adjusted under 35 U.S.C. 154(b) by 0 days.

(21) Appl. No.: 14/391,799

(22) PCT Filed: Mar. 11, 2013

(86) PCT No.: PCT/CN2013/072422
§ 371 (c)(1),
(2) Date: Oct. 10, 2014

(87) PCT Pub. No.: WO2013/189192
PCT Pub. Date: Dec. 27, 2013

(65) Prior Publication Data
US 2015/0073084 A1    Mar. 12, 2015

(30) Foreign Application Priority Data

Jun. 21, 2012  (CN) .......................... 2012 1 0207069

(51) Int. Cl.
| | | |
|---|---|---|
| *C09D 133/06* | (2006.01) | |
| *C09D 133/08* | (2006.01) | |
| *C08F 220/18* | (2006.01) | |
| *C08L 61/28* | (2006.01) | |
| *C08L 33/08* | (2006.01) | |
| *C09D 133/10* | (2006.01) | |

(52) U.S. Cl.
CPC ............ *C09D 133/08* (2013.01); *C08F 220/18* (2013.01); *C08L 33/08* (2013.01); *C08L 61/28* (2013.01); *C09D 133/066* (2013.01); *C09D 133/10* (2013.01)

(58) Field of Classification Search
CPC ............ C09D 133/066; C09D 133/08; C09D 133/10; C08F 220/26; C08F 220/06; C08F 220/10; C08L 33/08; C08L 33/10; C08L 33/12; C08L 61/28

USPC .......... 524/560, 561, 563, 577; 525/223, 222, 525/227, 228, 400, 540
See application file for complete search history.

(56) References Cited

U.S. PATENT DOCUMENTS

| | | | | |
|---|---|---|---|---|
| 3,654,229 A | * | 4/1972 | Hunsucker | C08G 4/00 524/317 |
| 3,674,734 A | * | 7/1972 | Parker | C09D 125/14 204/494 |
| 7,297,742 B2 | * | 11/2007 | Ohrbom | C08G 18/6254 427/372.2 |
| 2015/0073084 A1 | * | 3/2015 | Huang | 524/522 |

FOREIGN PATENT DOCUMENTS

| | | | | |
|---|---|---|---|---|
| CN | 102732119 A | * | 10/2012 | C09D 133/08 |
| WO | WO 2013/189192 A1 | * | 12/2013 | C08F 220/14 |

* cited by examiner

*Primary Examiner* — Rip A Lee
(74) *Attorney, Agent, or Firm* — IPro, Inc.; Na Xu

(57) ABSTRACT

Provided are an aqueous bicomponent baking type automobile finishing varnish with improved acid etching resistance and preparation method thereof, the aqueous bicomponent baking type automobile finishing varnish consisting of component A and component B; component A and component B both consist of a methylacrylate monomer, an acrylate monomer, a non-acrylate monomer, an acrylic monomer, a hydroxyl-containing acrylate monomer, and a chain transfer agent. The preparation method comprises: mixing component A and component B respectively with all the starting materials to prepare a solute, adding a solvent, uniformly mixing to obtain a solution, then adding an initiator to cause a solution polymerization reaction, lastly adding a neutralizer and adjusting to a desired level of neutralization, giving an aqueous acrylic resin A and an aqueous acrylic resin B respectively, lastly mixing the two given substances, adding a crosslinking agent and then water to adjust to the desired viscosity, thus obtaining the product. The product has excellent overall performance, especially good acid etching resistance, and lower raw material prices, and is an environmentally-friendly aqueous finishing varnish.

6 Claims, No Drawings

US 9,238,748 B2

AQUEOUS BICOMPONENT BAKING TYPE AUTOMOBILE FINISHING VARNISH WITH IMPROVED ACID ETCHING RESISTANCE AND PREPARATION METHOD THEREOF

This application is a national stage application of PCT application PCT/CN2013/072422 filed on Mar. 11, 2013, which is based on and claims priority to Chinese patent application 201210207069.2 filed on Jun. 21, 2012 in China. The entirety of each of the above-mentioned applications is hereby incorporated by reference herein in its entirety.

FIELD OF THE INVENTION

The invention relates to a water-based varnish composition, and more particularly to a baking type water-based automobile finishing varnish having improved acid resistance.

BACKGROUND OF THE INVENTION

With the continuous improvement of people's living standards, finishing varnish is widely applied to various products (such as automobiles, plastics, and glass products) to improve the decorative effect and protect the ground coat. Conventional finishing varnish mainly includes a resin-based film former and a solvent. The film former is formed by the cross-linking and curing of a polyester resin or an acrylic resin with an amino resin. Featuring good weathering resistance, the acrylic resin is preferable. In general, the solvent employs a volatile organic solvent. However, the finishing varnish has the following disadvantages:

1) Most finishing varnish can be only coated on a rough metal surface, but cannot be coated on the surface of plastics (ABS, PA, PB, PP, PC, PVC, etc.), glass, and alloy base having a smooth surface;

2) The hardness and flexibility of the varnish film cannot be both taken into account, the hardness is generally no more than 3H, and the flexibility is generally no more than 1;

3) The scratch resistance of the varnish film is poor;

4) The solvent resistance, boiling resistance, and perspiration resistance are bad;

5) The solvent is volatile and poisonous, which is harmful to environment and people;

6) The finishing varnish is difficult to spray (the varnish cannot be sprayed repeatedly on the wet film);

7) Pinholes and fisheye are inevitably formed on the surface of the varnish film, thereby resulting in poor evenness; and 8) The finishing varnish has low cost performance, so it is very difficult to popularize.

In summary, the existing finishing varnish has disadvantages of narrow field of application, poor scratch resistance, bad environmental performance, and high costs.

The finishing varnish sprayed on the automotive bodies is the final coating, which affects the whole decorative effect of an automobile, so it is required to have good glossiness. In addition, the coating is exposed to the air, acid rain, and air pollutants, and thus it should have good acid resistance. Currently, a typical car painting process employs a solvent-based varnish, which produces a large amount of volatile organic substances thereby polluting the environment. The environmentally friendly water-based finishing varnish on the market has high production cost and unsatisfactory performance, thereby limiting the application thereof.

SUMMARY OF THE INVENTION

In view of the above-described problems that existing finishing varnish is expensive and not environmentally friendly, it is one objective of the invention to provide a baking type water-based automobile finishing varnish having improved acid resistance and a preparation method thereof. The prepared finishing varnish has low production costs and is environmentally friendly.

To achieve the above objective, the following technical schemes are employed.

A baking type water-based automobile finishing varnish having improved acid resistance comprises a component A and a component B, and a mass ratio of the component A to the component B is 1-4:1.

The component A comprises 20-30 wt. % of a methacrylate monomer, 35-45 wt. % of an acrylate monomer, 5-15 wt. % of a non-acrylate monomer, 5-15 wt. % of an acrylic monomer, 10-20 wt. % of a hydroxyl-containing acrylate monomer, and 0.5-1.5 wt. % of a chain transfer agent.

The component B comprises 5-15 wt. % of the methacrylate monomer, 35-45 wt. % of the acrylate monomer, 5-15 wt. % of the non-acrylate monomer, 5-15 wt. % of the acrylic monomer, 25-35 wt. % of the hydroxyl-containing acrylate monomer, and 0.5-1.5 wt. % of the chain transfer agent.

With regard to the baking type water-based automobile finishing varnish having improved acid resistance, the methacrylate monomer is selected from the group consisting of methyl methacrylate, ethyl methacrylate, isopropyl methacrylate, isobutyl methacrylate, and t-butyl methacrylate.

The acrylate monomer is selected from the group consisting of butyl acrylate, methyl acrylate, ethyl acrylate, isopropyl acrylate, n-propyl acrylate, 2-ethylhexyl acrylate, and isobutyl acrylate.

The non-acrylate monomer is styrene or vinyl acetate.

The acrylic monomer is selected from the group consisting of acrylic acid, methacrylic acid, and itaconic acid.

The hydroxyl-containing acrylate monomer is selected from the group consisting of β-hydroxyethyl acrylate, β-hydroxypropyl acrylate, β-hydroxyethyl methacrylate, and β-hydroxypropyl methacrylate.

The chain transfer agent is selected from the group consisting of dodecyl mercaptan, carbon tetrachloride, n-butyl mercaptan, tert-butyl mercaptan, carbon tetrabromide, n-butyl sulfide, isopropylbenzene, β-naphthalenethiol, and carbon tetrachloride.

In the finishing varnish, the component A comprises 20-30 wt. % of methyl methacrylate, 35-45 wt. % of butyl acrylate, 5-15 wt. % of styrene, 5-15 wt. % of acrylic acid, 10-20 wt. % of β-hydroxyethyl methacrylate, and 0.5-1.5 wt. % of dodecyl mercaptan.

The component B comprises 5-15 wt. % of methyl methacrylate, 35-45 wt. % of butyl acrylate, 5-15 wt. % of styrene, 5-15 wt. % of acrylic acid, 25-35 wt. % of β-hydroxyethyl methacrylate, and 0.5-1.5 wt. % of dodecyl mercaptan.

In the finishing varnish, the component A comprises 25 wt. % of methyl methacrylate, 40 wt. % of butyl acrylate, 10 wt. % of styrene, 9 wt. % of acrylic acid, 15 wt. % of β-hydroxyethyl methacrylate, and 1.0 wt. % of dodecyl mercaptan.

The component B comprises 10 wt. % of methyl methacrylate, 40 wt. % of butyl acrylate, 10 wt. % of styrene, 9 wt. % of acrylic acid, 30 wt. % of β-hydroxyethyl methacrylate, and 1.0 wt. % of dodecyl mercaptan.

The invention also provides a method for preparing the baking type water-based automobile finishing varnish having improved acid resistance, the method comprising:

a) weighing raw materials according to the component A, mixing the weighed raw materials to yield a first solute, dissolving the first solute in a solvent whereby obtaining a first solution having a mass percentage concentration of 50-70%; adding an initiator accounting for 1.4-3 wt. % of the solute to the first solution, uniformly mixing to yield a solution A; conducting a solution polymerization reaction on the solution A to yield an acryl resin A; cooling the solution A to a temperature of between 50 and 60° C., adding a neutralizer to the cooled solution A to regulate a neutralization value of the acryl resin A to 60-100%, whereby obtaining a water-based acryl resin A;

b) weighing raw materials according to the component B, mixing the weighed raw materials to yield a second solute, dissolving the second solute in the solvent whereby obtaining a second solution having a mass percentage concentration of 50-70%; adding the initiator accounting for 0.3-1.1 wt. % of the solute to the second solution, uniformly mixing to yield a solution B; conducting the solution polymerization reaction on the solution B to yield an acryl resin B; cooling the solution B to a temperature of between 50 and 60° C., adding the neutralizer to the cooled solution B to regulate a neutralization value of the acryl resin B to 60-100%, whereby obtaining a water-based acryl resin B;

c) uniformly mixing the water-based acryl resin A obtained from step a) and the water-based acryl resin B obtained from step b) with a mass ratio thereof of 1-4:1, whereby yielding a mixed water-based acryl resin, adding hexamethoxy methyl melamine-formaldehyde resin as a crosslinking agent to the mixed water-based acryl resin, a mass ratio of the mixed water-based acryl resin to the crosslinking agent being 2-3:1, and diluting the mixed water-based acryl resin using water to reach a required viscosity, whereby yielding the baking type water-based automobile finishing varnish having improved acid etching resistance.

In this method, the solvent is one or two selected from the group consisting of propylene glycol methyl ether, isopropanol, ethanol, propanol, butanol, isobutanol, sec-butanol, tert-butanol, 1-ethoxy-2-propanol, 1-isopropoxy-2-propanol, 1-propoxy-2-prop anol, 1-butoxy-2-propanol.

The initiator is selected from the group consisting of azobisisobutyronitrile, azobisisoheptonitrile, benzoyl peroxide, di-tert-butyl peroxide, t-butyl peroxybenzoate, 60% dimethyl terephthalate solution, and diisobutyryl peroxide.

The neutralizer is selected from the group consisting of dimethyl ethanolamine, morpholine, ethylamine, diethylamine, triethylamine, diethylethanolamine, monoethanolamine, diethanolamine, triethanolamine and diisopropanolamine.

In this method, the solvent is a mixture of propylene glycol methyl ether and isopropanol with a volume ratio thereof of 1-4:1.

The initiator is azobisisobutyronitrile, and the neutralizer is dimethyl ethanolamine.

In this method, a temperature for the solution polymerization reaction is controlled at between 80 and 120° C., and a reaction time is controlled for 6 and 8 hrs.

The number-average molecular weight of the water-based acryl resin A resulting from the solution polymerization reaction of the raw materials of the component A is about 10000, and the number-average molecular weight of the water-based acryl resin B resulting from the solution polymerization reaction of the raw materials of the component B is about 20000. The water-based acryl resin A, the water-based acryl resin B, and the crosslinking agent are mixed, where hydroxyls of the resins react with the crosslinking agent. With regard to the material, structure, and properties of the cross-linked polymer, the higher the molecular weight of the resin, the better the mechanical properties of the polymer. However, if the molecular weight of the resin is too large, so is the viscosity, which is not beneficial to the crosslinking reaction. Furthermore, high crosslinking degree results in high hardness and good chemical resistance. In this invention, the water-based acryl resin A and the water-based acryl resin B are mixed with a mass ratio thereof of 1-4:1. The water-based acryl resin B has a relatively high molecular weight and more hydroxyls which are twice as much as that in the water-based acryl resin A, but it has a low percentage in the mixed resin. Thus, the viscosity of the mixed resin is so not large, the crosslinking reaction can proceed smoothly, and thus both the average molecular weight of the mixed resin and the crosslinking degree of the varnish film are improved. The final product of the invention has compact cross-linked structure and excellent comprehensive performance.

Advantages according to the present disclosure of the invention are summarized as follows:

1. The number-average molecular weight of the water-based acryl resin A resulting from the solution polymerization reaction of the raw materials of the component A is about 10000, and the number-average molecular weight of the water-based acryl resin B resulting from the solution polymerization reaction of the raw materials of the component B is about 20000. The water-based acryl resin A, the water-based acryl resin B, and hexamethoxy methyl melamine-formaldehyde resin as the crosslinking agent are mixed and cross-linked. The resulting product has compact cross-linked structure and the varnish film has excellent comprehensive performance, for example, good acid resistance. The involved raw materials are cheap thereby decreasing the production costs.

2. The varnish film of the finishing varnish has a pencil hardness of 2H, impact strength of 50 kg·cm, adhesive force of grade 1, flexibility of 1 mm, glossiness of 113 (60°), and good acid resistance. For example, 30% sulfuric acid solution is employed as an acid medium to immerse the varnish film at 25° C. for at least 56 hours, and no bubbles and no blushing are observed.

3. The raw materials in this invention are cheap and easily available, and the final product has low production costs and the production process is simple, which is beneficial to popularization.

4. The water-based finishing varnish of the invention produces only a small number of volatile organic substances, so it is environmentally friendly.

DETAILED DESCRIPTION OF THE EMBODIMENTS

For further illustrating the invention, experiments detailing a baking type water-based automobile finishing varnish having improved acid resistance and preparation method thereof are described below.

Example 1

A baking type water-based automobile finishing varnish having improved acid resistance comprises a component A and a component B, and a mass ratio of the component A to the component B is 3:1.

The component A comprises 25 wt. % of methyl methacrylate, 40 wt. % of butyl acrylate, 10 wt. % of styrene, 9 wt. % of acrylic acid, 15 wt. % of β-hydroxyethyl methacrylate, and 1.0 wt. % of dodecyl mercaptan.

The component B comprises 10 wt. % of methyl methacrylate, 40 wt. % of butyl acrylate, 10 wt. % of styrene, 9 wt. % of acrylic acid, 30 wt. % of β-hydroxyethyl methacrylate, and 1.0 wt. % of dodecyl mercaptan.

A method for preparing the baking type water-based automobile finishing varnish having improved acid resistance, comprises the following steps:

a) weighing raw materials according to the component A, mixing the weighed raw materials to yield a first solute, dissolving the first solute in a solvent comprising propylene glycol methyl ether and isopropanol (a volume ratio of propylene glycol methyl ether to isopropanol is 2:1) whereby obtaining a first solution having a mass percentage concentration of 60%; adding azobisisobutyronitrile as an initiator accounting for 1.7 wt. % of the solute to the first solution, uniformly mixing to yield a solution A; conducting a solution polymerization reaction (the reaction temperature is between 80 and 120° C., the reaction time is between 6 and 8 hours) on the solution A to yield an acryl resin A; cooling the solution A to a temperature of between 50 and 60° C., adding dimethylethanolamine as a neutralizer to the cooled solution A to regulate a neutralization value of the acryl resin A to 70%, whereby obtaining a water-based acryl resin A;

b) weighing raw materials according to the component B, mixing the weighed raw materials to yield a second solute, dissolving the second solute in the solvent comprising propylene glycol methyl ether and isopropanol (a volume ratio of propylene glycol methyl ether to isopropanol is 2:1) whereby obtaining a second solution having a mass percentage concentration of 60%; adding azobisisobutyronitrile as an initiator accounting for 0.5 wt. % of the solute to the second solution, uniformly mixing to yield a solution B; conducting the solution polymerization reaction (the reaction temperature is between 80 and 120° C., the reaction time is between 6 and 8 hours) on the solution B to yield an acryl resin B; cooling the solution B to a temperature of between 50 and 60° C., adding the neutralizer to the cooled solution B to regulate a neutralization value of the acryl resin B to 70%, whereby obtaining a water-based acryl resin B;

c) uniformly mixing the water-based acryl resin A obtained from step a) and the water-based acryl resin B obtained from step b) with a mass ratio thereof of 3:1, whereby yielding a mixed water-based acryl resin, adding hexamethoxy methyl melamine-formaldehyde resin as a crosslinking agent to the mixed water-based acryl resin, a mass ratio of the mixed water-based acryl resin to the crosslinking agent being 3:1, and diluting the mixed water-based acryl resin using water to reach a required viscosity, whereby yielding the baking type water-based automobile finishing varnish having improved acid etching resistance.

Example 2

A baking type water-based automobile finishing varnish having improved acid resistance comprises a component A and a component B, and a mass ratio of the component A to the component B is 4:1.

The component A comprises 23 wt. % of methyl methacrylate, 45 wt. % of butyl acrylate, 6.5 wt. % of styrene, 15 wt. % of acrylic acid, 10 wt. % of β-hydroxyethyl methacrylate, and 0.5 wt. % of dodecyl mercaptan.

The component B comprises 15 wt. % of methyl methacrylate, 37 wt. % of butyl acrylate, 15 wt. % of styrene, 6 wt. % of acrylic acid, 26.5 wt. % of β-hydroxyethyl methacrylate, and 0.5 wt. % of dodecyl mercaptan.

A method for preparing the baking type water-based automobile finishing varnish having improved acid resistance is basically the same as that in Example 1 except the following differences:

a) dissolving the first solute in a solvent comprising propylene glycol methyl ether and isopropanol (a volume ratio of propylene glycol methyl ether to isopropanol is 3:1) whereby obtaining a first solution having a mass percentage concentration of 70%; adding t-butyl peroxybenzoateas an initiator accounting for 1.2 wt. % of the solute to the first solution, uniformly mixing to yield a solution A; conducting a solution polymerization reaction (the reaction temperature is between 80 and 120° C., the reaction time is between 6 and 8 hours) on the solution A to yield an acryl resin A; cooling the solution A to a temperature of between 50 and 60° C., adding diisopropanolamine as a neutralizer to the cooled solution A to regulate a neutralization value of the acryl resin A to 60%, whereby obtaining a water-based acryl resin A;

b) dissolving the second solute in the solvent comprising propylene glycol methyl ether and isopropanol (a volume ratio of propylene glycol methyl ether to isopropanol is 3:1) whereby obtaining a second solution having a mass percentage concentration of 70%; adding t-butyl peroxybenzoate as an initiator accounting for 0.8 wt. % of the solute to the second solution, uniformly mixing to yield a solution B; conducting the solution polymerization reaction (the reaction temperature is between 80 and 120° C., the reaction time is between 6 and 8 hours) on the solution B to yield an acryl resin B; cooling the solution B to a temperature of between 50 and 60° C., adding diisopropanolamine as the neutralizer to the cooled solution B to regulate a neutralization value of the acryl resin B to 60%, whereby obtaining a water-based acryl resin B;

c) uniformly mixing the water-based acryl resin A obtained from step a) and the water-based acryl resin B obtained from step b) with a mass ratio thereof of 4:1, whereby yielding a mixed water-based acryl resin, adding a crosslinking agent to the mixed water-based acryl resin, a mass ratio of the mixed water-based acryl resin to the crosslinking agent being 2:1.

Example 3

A baking type water-based automobile finishing varnish having improved acid resistance comprises a component A and a component B, and a mass ratio of the component A to the component B is 2:1.

The component A comprises 30 wt. % of methyl methacrylate, 35 wt. % of butyl acrylate, 8.5 wt. % of styrene, 5 wt. % of acrylic acid, 20 wt. % of β-hydroxyethyl methacrylate, and 1.5 wt. % of dodecyl mercaptan.

The component B comprises 5 wt. % of methyl methacrylate, 45 wt. % of butyl acrylate, 5 wt. % of styrene, 15 wt. % of acrylic acid, 28.5 wt. % of β-hydroxyethyl methacrylate, and 1.5 wt. % of dodecyl mercaptan.

A method for preparing the baking type water-based automobile finishing varnish having improved acid resistance is basically the same as that in Example 1 except the following differences:

a) dissolving the first solute in a solvent comprising propylene glycol methyl ether and isopropanol (a volume ratio of propylene glycol methyl ether to isopropanol is 4:1) whereby obtaining a first solution having a mass percentage concentration of 50%; adding azobisisoheptonitrile as an initiator accounting for 1.5 wt. % of the solute to the first solution, uniformly mixing to yield a solution A; conducting a solution polymerization reaction (the reaction temperature is between 80 and 120° C., the reaction time is between 6 and 8 hours) on the solution A to yield an acryl resin A; cooling the solution A to a temperature of between 50 and 60° C., adding diethylethanolamine as a neutralizer to the cooled solution A to regulate a neutralization value of the acryl resin A to 80%, whereby obtaining a water-based acryl resin A;

b) weighing raw materials according to the component B, mixing the weighed raw materials to yield a second solute, dissolving the second solute in the solvent comprising propylene glycol methyl ether and isopropanol (a volume ratio of propylene glycol methyl ether to isopropanol is 4:1) whereby obtaining a second solution having a mass percentage concentration of 50%; adding azobisisoheptonitrile as an initiator accounting for 1.0 wt. % of the solute to the second solution, uniformly mixing to yield a solution B; conducting the solution polymerization reaction (the reaction temperature is between 80 and 120° C., the reaction time is between 6 and 8 hours) on the solution B to yield an acryl resin B; cooling the solution B to a temperature of between 50 and 60° C., adding diethylethanolamine as the neutralizer to the cooled solution B to regulate a neutralization value of the acryl resin B to 80%, whereby obtaining a water-based acryl resin B;

c) uniformly mixing the water-based acryl resin A obtained from step a) and the water-based acryl resin B obtained from step b) with a mass ratio thereof of 2:1, whereby yielding a mixed water-based acryl resin, adding a crosslinking agent to the mixed water-based acryl resin, a mass ratio of the mixed water-based acryl resin to the crosslinking agent being 2:1.

Example 4

A baking type water-based automobile finishing varnish having improved acid resistance comprises a component A and a component B, and a mass ratio of the component A to the component B is 1:1.

The component A comprises 27 wt. % of methyl methacrylate, 38 wt. % of butyl acrylate, 8 wt. % of styrene, 10 wt. % of acrylic acid, 16 wt. % of β-hydroxyethyl methacrylate, and 1.0 wt. % of dodecyl mercaptan.

The component B comprises 9 wt. % of methyl methacrylate, 39 wt. % of butyl acrylate, 9 wt. % of styrene, 10 wt. % of acrylic acid, 32 wt. % of β-hydroxyethyl methacrylate, and 1.0 wt. % of dodecyl mercaptan.

A method for preparing the baking type water-based automobile finishing varnish having improved acid resistance is the same as that in Example 1.

Example 5

A baking type water-based automobile finishing varnish having improved acid resistance comprises a component A and a component B, and a mass ratio of the component A to the component B is 3:1.

The component A comprises 25 wt. % of ethyl methacrylate, 40 wt. % of methyl acrylate, 10 wt. % of vinyl acetate, 9 wt. % of methacrylic acid, 15 wt. % of β-hydroxyethyl acrylate, and 1.0 wt. % of n-butyl mercaptan.

The component B comprises 10 wt. % of ethyl methacrylate, 40 wt. % of methyl acrylate, 10 wt. % of vinyl acetate, 9 wt. % of methacrylic acid, 30 wt. % of β-hydroxyethyl acrylate, and 1.0 wt. % of n-butyl mercaptan.

A method for preparing the baking type water-based automobile finishing varnish having improved acid resistance is the same as that in Example 1.

Example 6

A baking type water-based automobile finishing varnish having improved acid resistance comprises a component A and a component B, and a mass ratio of the component A to the component B is 2:1.

The component A comprises 23 wt. % of isopropyl methacrylate, 45 wt. % of ethyl acrylate, 6.5 wt. % of styrene, 15 wt. % of itaconic acid, 10 wt. % of β-hydroxypropyl acrylate, and 0.5 wt. % of n-butyl sulfide.

The component B comprises 15 wt. % of isopropyl methacrylate, 37 wt. % of ethyl acrylate, 15 wt. % of styrene, 6 wt. % of itaconic acid, 26.5 wt. % of β-hydroxypropyl acrylate, and 0.5 wt. % of n-butyl sulfide.

A method for preparing the baking type water-based automobile finishing varnish having improved acid resistance is the same as that in Example 1.

Example 7

A baking type water-based automobile finishing varnish having improved acid resistance comprises a component A and a component B, and a mass ratio of the component A to the component B is 4:1.

The component A comprises 30 wt. % of t-butyl methacrylate, 35 wt. % of isobutyl acrylate, 8.5 wt. % of styrene, 5 wt. % of acrylic acid, 20 wt. % of β-hydroxypropyl methacrylate, and 1.5 wt. % of isopropylbenzene.

The component B comprises 5 wt. % of t-butyl methacrylate, 45 wt. % of isobutyl acrylate, 5 wt. % of styrene, 15 wt. % of acrylic acid, 28.5 wt. % of β-hydroxypropyl-methacrylate, and 1.5 wt. % of isopropylbenzene.

A method for preparing the baking type water-based automobile finishing varnish having improved acid resistance is the same as that in Example 1.

Example 8

A baking type water-based automobile finishing varnish having improved acid resistance comprises a component A and a component B, and a mass ratio of the component A to the component B is 4:1.

The component A comprises 27 wt. % of methyl methacrylate, 38 wt. % of n-propyl acrylate, 8 wt. % of vinyl acetate, 10 wt. % of acrylic acid, 16 wt. % of β-hydroxyethyl methacrylate, and 1.0 wt. % of dodecyl mercaptan.

The component B comprises 9 wt. % of methyl methacrylate, 39 wt. % of n-propyl acrylate, 9 wt. % of vinyl acetate, 10 wt. % of acrylic acid, 32 wt. % of β-hydroxyethyl methacrylate, and 1.0 wt. % of dodecylmercaptan.

A method for preparing the baking type water-based automobile finishing varnish having improved acid resistance is the same as that in Example 1.

The varnish film of the finishing varnish has a pencil hardness of 2H, impact strength of 50 kg cm, adhesive force of grade 1, flexibility of 1 mm, glossiness of 113 (60°), and good acid resistance. For example, 30% sulfuric acid solution is employed as an acid medium to immerse the varnish film at 25° C. for at least 56 hours, and no bubbles and no blushing are observed.

The invention claimed is:

1. A baking type water-based automobile finishing varnish having improved acid resistance, wherein, the baking type water-based automobile finishing varnish is prepared by following steps:

a) weighing raw materials according to the component A, the component A comprises 20-30 wt. % of a methacrylate monomer, 35-45 wt. % of a nacrylate monomer, 5-15 wt. % of a non-acrylate monomer, 5-15 wt. % of an acrylic monomer, 10-20 wt. % of a hydroxyl-containing acrylate monomer, and 0.5-1.5 wt. % of a chain transfer agent; mixing the weighed raw materials to yield a first solute, dissolving the first solute in a solvent whereby obtaining a first solution having a mass percentage concentration of 50-70%; adding an initiator accounting for 1.4-3 wt. % of the solute to the first solution, uniformly mixing to yield a solution A; conducting a solution polymerization reaction on the solution A to yield an acryl resin A; cooling the solution A to a temperature of between 50 and 60° C., adding a neutralizer to the cooled solution A to regulate a neutralization value of the acryl resin A to 60-100%, whereby obtaining a water-based acryl resin A with a number-average molecular weight of about 10000;

b) weighing raw materials according to the component B, the component B comprises 5-15 wt. % of the methacrylate monomer, 35-45 wt. % of the acrylate monomer, 5-15 wt. % of the non-acrylate monomer, 5-15 wt. % of the acrylic monomer, 25-35 wt. % of the hydroxyl-containing acrylate monomer, and 0.5-1.5 wt. % of the chain transfer agent; mixing the weighed raw materials to yield a second solute, dissolving the second solute in the solvent whereby obtaining a second solution having a mass percentage concentration of 50-70%; adding the initiator accounting for 0.3-1.1 wt. % of the solute to the second solution, uniformly mixing to yield a solution B; conducting the solution polymerization reaction on the solution B to yield an acryl resin B; cooling the solution B to a temperature of between 50 and 60° C., adding the neutralizer to the cooled solution B to regulate a neutralization value of the acryl resin B to 60-100%, whereby obtaining a water-based acryl resin B with a number-average molecular weight of about 20000;

c) uniformly mixing the water-based acryl resin A obtained from step a) and the water-based acryl resin B obtained from step b) with a mass ratio thereof of 1-4:1, whereby yielding a mixed water-based acryl resin, adding hexamethoxy methyl melamine-formaldehyde resin as a crosslinking agent to the mixed water-based acryl resin, a mass ratio of the mixed water-based acryl resin to the crosslinking agent being 2-3:1, and diluting the mixed water-based acryl resin using water to reach a required viscosity, whereby yielding the baking type water-based automobile finishing varnish having improved acid etching resistance;

wherein
the methacrylate monomer is selected from the group consisting of methyl methacrylate, ethyl methacrylate, isopropyl methacrylate, isobutyl methacrylate, and t-butyl methacrylate;
the acrylate monomer is selected from the group consisting of butyl acrylate, methyl acrylate, ethyl acrylate, isopropyl acrylate, n-propyl acrylate, 2-ethylhexyl acrylate, and isobutyl acrylate;
the non-acrylate monomer is styrene or vinyl acetate;
the acrylic monomer is selected from the group consisting of acrylic acid, methacrylic acid, and itaconic acid;
the hydroxyl-containing acrylate monomer is selected from the group consisting of β-hydroxyethyl acrylate, β-hydroxypropyl acrylate, β-hydroxyethyl methacrylate, and β-hydroxypropyl methacrylate;
the chain transfer agent is selected from the group consisting of dodecyl mercaptan, carbon tetrachloride, n-butyl mercaptan, tert-butyl mercaptan, carbon tetrabromide, n-butyl sulfide, isopropylbenzene, β-naphthalenethiol, and carbon tetrachloride.

2. The finishing varnish of claim 1, wherein
the component A comprises 20-30 wt. % of methyl methacrylate, 35-45 wt. % of butyl acrylate, 5-15 wt. % of styrene, 5-15 wt. % of acrylic acid, 10-20 wt. % of β-hydroxyethyl methacrylate, and 0.5-1.5 wt. % of dodecyl mercaptan; and
the component B comprises 5-15 wt. % of methyl methacrylate, 35-45 wt. % of butyl acrylate, 5-15 wt. % of styrene, 5-15 wt. % of acrylic acid, 25-35 wt. % of β-hydroxyethyl methacrylate, and 0.5-1.5 wt. % of dodecyl mercaptan.

3. The finishing varnish of claim 2, wherein
the component A comprises 25 wt. % of methyl methacrylate, 40 wt. % of butyl acrylate, 10 wt. % of styrene, 9 wt. % of acrylic acid, 15 wt. % of β-hydroxyethyl methacrylate, and 1.0 wt. % of dodecyl mercaptan; and
the component B comprises 10 wt. % of methyl methacrylate, 40 wt. % of butyl acrylate, 10 wt. % of styrene, 9 wt. % of acrylic acid, 30 wt. % of β-hydroxyethyl methacrylate, and 1.0 wt. % of dodecyl mercaptan.

4. The finishing varnish of claim 1, wherein
the solvent is one or two selected from the group consisting of propylene glycol methyl ether, isopropanol, ethanol, propanol, butanol, isobutanol, sec-butanol, tert-butanol, 1-ethoxy-2-propanol, 1-isopropoxy-2-propanol, 1-propoxy-2-propanol, and 1-butoxy-2-propanol;
the initiator is selected from the group consisting of azobisisobutyronitrile, azobisisoheptonitrile, benzoyl peroxide, di-tert-butyl peroxide, t-butyl peroxybenzoate, 60% dimethyl terephthalate solution, and diisobutyryl peroxide; and
the neutralizer is selected from the group consisting of dimethyl ethanolamine, morpholine, ethylamine, diethylamine, triethylamine, diethylethanolamine, monoethanolamine, diethanolamine, triethanolamine and diisopropanolamine.

5. The finishing varnish of claim 1, wherein the solvent is a mixture of propylene glycol methyl ether and isopropanol with a volume ratio thereof of 1-4:1; the initiator is azobisisobutyronitrile, and the neutralizer is dimethyl ethanolamine.

6. The finishing varnish of claim 1, wherein a temperature for the solution polymerization reaction is controlled at between 80 and 120° C., and a reaction time is controlled for 6 and 8 hrs.

* * * * *